(12) United States Patent
Gottlieb et al.

(10) Patent No.: US 6,530,273 B1
(45) Date of Patent: Mar. 11, 2003

(54) METERING DEVICE AND METHOD FOR DELIVERING FLUID EMPLOYING A COMPENSATING ELEMENT

(75) Inventors: Bernhard Gottlieb, Munich (DE); Hans Meixner, Munich (DE); Andreas Kappel, Brunnthal (DE); Randolf Mock, Munich (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/449,084

(22) Filed: Nov. 24, 1999

(30) Foreign Application Priority Data

Nov. 25, 1998 (DE) .......................... 198 54 506

(51) Int. Cl.⁷ .......................... G01F 15/00; B67D 3/00; B05B 1/08; F16K 31/02

(52) U.S. Cl. .................. 73/272 R; 239/102.2; 239/88; 239/533.2; 251/129.06; 222/504; 222/509; 222/518

(58) Field of Search .............. 73/272 R, 262, 73/271, 272, 274; 222/504, 509, 518; 251/129.06; 239/102.2, 88, 95, 96, 533.2

(56) References Cited

U.S. PATENT DOCUMENTS 5,697,554 A * 12/1997 Auwaerter et al. .......... 239/88

FOREIGN PATENT DOCUMENTS

DE        198 38 862 A1    3/2000

* cited by examiner

Primary Examiner—Hezron Williams
Assistant Examiner—C. Dickens
(74) Attorney, Agent, or Firm—Baker Botts LLP

(57) ABSTRACT

A metering device and method for delivering fluid that employs a compensating element. The metering device has a housing defining a fluid chamber that contains a pressurized fluid. The housing further encloses an actuating drive, a valve needle and a compensating element. The housing terminates at a housing opening for delivery of fluid to the outside of the housing. Fluid is delivered from the housing by moving the actuating drive which in turn displaces the valve needle in an opening direction. Upon displacement of the valve needle, the valve needle moves axially in the opening direction with little, if any, lift loss due to the compensating element. The compensating element further acts to compensate for shifting or movement of metering components due to external factors, such as varying thermal loads, aging effects, and settling effects.

20 Claims, 2 Drawing Sheets

METERING DEVICE AND METHOD FOR DELIVERING FLUID EMPLOYING A COMPENSATING ELEMENT

BACKGROUND OF THE INVENTION

1. Field of the Invention

The invention relates to a metering device and method for delivering fluid that utilizes a compensating element.

2. Description of the Prior Art

Traditional metering devices include a fluid chamber that is situated in a housing wherein the fluid chamber contains a pressurized fluid that is discharged through an orifice or opening of the metering device and into an outside space. The traditional metering devices further include a valve needle that can be displaced by an actuating drive such that movement of the valve needle opens and closes the opening of the metering device.

The metering process typically occurs at high speed such that the actuating drive and the valve needle move a distance that ranges from 30 μm to 40 μm. Likewise, the metering device components, such as the actuating drive and valve needle, shift or move due to external factors, such as varying temperature loads, aging effects, and settling effects. This shifting or movement is of the same order of magnitude as the movement of the metering components, such as the valve needle and actuating drive, during the metering process as previously discussed. This shifting or movement due to varying thermal loads typically occurs within an injector of an automobile engine. The varying thermal load typically ranges from −40° C. to 160° C.

However, the shifting or movement of the metering device due to external factors can cause the metering device to operate less effectively. For example, the opening of the metering device may not remain hydraulically sealed due to the shifting or movement because the components can move or shift at different rates or Wearying positions relative to each other. Aging and settling can result in similar effects on the metering device.

To compensate for this shifting or movement due to varying temperature loads, attempts have been made to thermally balance the metering device by appropriately selecting thermally compatible materials for each of the individual metering device components. However, a device or method that utilizes this compensation technique is not known for varying temperature loads that range from −40° C. to 160° C.

The German Patent Application P 19838862.4 discloses a metering device wherein the actuating drive controls the movement of a valve needle via a hydraulic chamber. The hydraulic chamber is connected to a hydraulic storage that is positioned in the fluid chamber and also serves as a pressure reserve. The connection between the hydraulic chamber and the hydraulic storage is made in a throttled manner so that the fast movement of the actuating drive is hydraulically transferred to the valve needle, whereas a slow change of pressure in the hydraulic chamber due to a varying thermal load, for example, can be compensated by a fluid compensation with the hydraulic storage.

SUMMARY OF THE INVENTION

An objective of the present invention is to provide a metering device and method for delivering fluid that compensates for shifting or movement of various metering device components due to varying thermal loads or other external factors, such as aging or settling effects.

A further objective of the present invention is to provide a simplified, reliable and precise metering device and method of delivering fluids that compensates for the shifting or movement of various metering device components due to varying thermal loads or other external factors.

The present invention includes a valve needle that is positioned within a fluid chamber. The valve needle is attached to a compensating element. The compensating elements operates to compensate for the shifting or movement of the valve needle or other metering device components due to varying thermal loads or other external factors while at the same time resulting in negligible, if any, lift loss as the valve needle moves to delivery fluid during the metering process.

The valve needle further includes a first needle part that is connected to the actuating drive and a second needle part by which the orifice or opening of the metering device can be closed or opened. In addition, the compensating element includes a compensating element hydraulic chamber that is defined by a first wall, a second wall and an outside wall wherein the first wall, second wall and outside wall are flexibly interconnected. The compensating element hydraulic chamber is connected to the metering device fluid chamber by a compensating element opening. This opening is constructed such that the change of pressure of the fluid in the compensating element hydraulic chamber due to the fluid exchange between the compensating element hydraulic chamber and the fluid chamber does not significantly influence the transfer of movement from the first needle part to the second needle part of the valve needle during the delivery of fluid of the metering process.

On the other hand, this opening is constructed such that the shifting or movement of the valve needle or other metering device component due to varying thermal loads or other external factors is balanced or compensated by balancing the pressures of the compensating element hydraulic chamber and the metering device fluid chamber. Typically, the shifting or movement due to external factors, such as varying thermal loads, is on order of magnitude 100 to 1000 times slower as compared to the movement of the valve needle or other metering device components during the delivery of fluid of the metering process. Because of the relatively slow shifting or movement of the valve needle due to varying thermal loads or other external factors, a change of pressure in the hydraulic chamber is balanced by a fluid exchange with the fluid chamber such that the movement of one needle part is not transferred to the respective other needle part. For example, the compensating element hydraulic chamber compensates for a slow displacement of the valve needle relative to the housing due to varying thermal loads or other factors by changing its volume without effecting a pressure buildup in the hydraulic chamber of the housing of the metering device.

Therefore, a change in the length or shifting or movement of various components of the metering device, such as the valve needle, due to varying temperature loads or other factors, is balanced by a modified spacing between the first wall and the second wall of the compensating element. In an initial position, this spacing is adjusted by the balance between the inertial force acting on the valve needle in an axial direction and the spring force of the connecting compensating element outside wall.

In an embodiment, the present invention provides that the first and second wall of the compensating element are fastened perpendicularly and centered relative to the longitudinal axis of the valve needle.

In a further embodiment, the first and second wall of the compensating element are discoid or disk-shaped and have the same diameter.

In an embodiment, the compensating element can be inserted independently of the shape of the first wall and the second wall wherein the mass of the first and second walls is advantageously minimal in order to avoid inertial effects during the respective fluid delivery operation. The first and second walls can also be radially offset to one another and likewise can be tilted with respect to the longitudinal axis of the valve needle.

In an embodiment, the outside wall of the compensating element includes metal bellows wherein the metal bellows are stainless steel due to the high corrosive resistance property and durable and lasting wear of stainless steel. The outside wall is preferably attached to the outside of the contact area of the first and second wall of the compensating element so that damage to the outside wall can be avoided as a result of the contact made between the first and second walls In an embodiment, the compensating element hydraulic chamber exhibits a high spring constant so that lift loss does not occur due to the elasticity of the enclosed fluid volume. The high spring constant can be preferably achieved by a low height of the compensating element chamber.

In an embodiment, the metering device with the compensating element of the present invention is utilized for fuel injection, preferably gasoline direct injection.

In an embodiment, the valve needle opens to the outside of the metering device.

In an embodiment, the valve needle opens to the inside of the metering device.

An advantage of the present invention is that it provides a simple construction in contrast to traditional metering devices.

Another advantage of the present invention is that the compensating element operates to adjust or compensate for shifting or movement of a variety of metering device components, including the valve needle and housing, due to external factors, such as varying thermal loads, aging or settling effects.

It is still yet another advantage of the present invention to compensate for the shifting and movement of various metering device components due to external factors resulting in negligible, if any, lift loss of the valve needle during the delivery of fluid of the metering process.

DETAILED DESCRIPTION OF THE PREFERRED EMBODIMENTS

Figure 3:
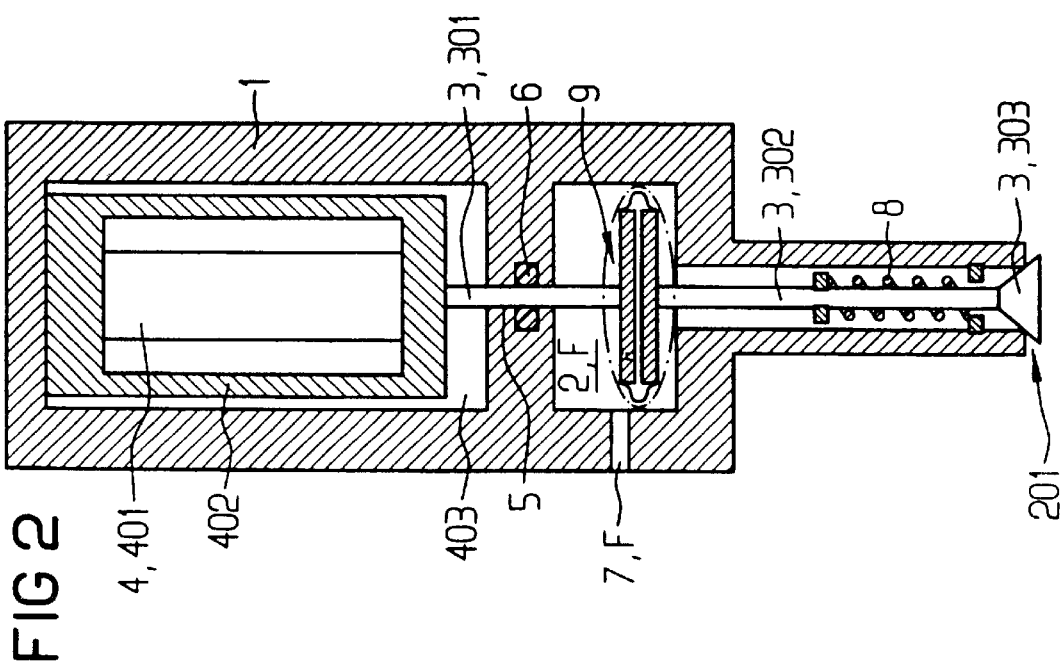
FIG. 3 is a side sectional view of a traditional metering device.

FIG. 3 shows a traditional metering device that is directly actuated and opens to the outside. A fluid chamber 2 that leads to the outside at an orifice or opening 201 is installed in a housing 1. A valve needle 3 at one end is fastened at an actuating drive 4 and leads through the fluid chamber 2. The actuating drive 4 includes a piezo-actuator 401 that is preferably a ceramic multi-layer piezo-actuator. The piezo-actuator 401 is held under a compressive strain within an actuating chamber 403 via a tube spring 402 that is fastened to the housing 1.

The valve needle 3 is axially displaceable and is guided through an opening 5 between the actuating chamber 403 and the fluid chamber 2. The fit between valve needle 3 and the housing 1 is hydraulically sealed via a seal 6. The seal 6 is preferably an elastomer O-ring so that fluid F does not reach the actuating chamber 403.

The valve needle 3, at its end opposite of the actuating drive 4, is equipped with a seal head 303. The seal head 303 is preferably placed against the orifice or opening 201 on the outside of the fluid chamber 2. In this way, the seal head 303 hydraulically seals the orifice opening.

In order to close the orifice or opening 201 of the traditional metering device, the valve needle 3 is pushed in the direction of an actuating drive 4 via a resetting spring 8 so that the seal head 303 is pressed against the housing 1. The bearing surface of the seal head 303 against the housing 1 is preferably shaped as a seal seat. The fluid chamber 2 is charged with a fluid F via a fluid feeder 7, typically under a pressure that ranges from 150 bar to 200 bar. The fluid feeder is preferably of a known type such as one that is utilized in a common-rail system.

During the metering process, the piezo-actuator 401 moves the valve needle 3 a distance or length that ranges from 10 $\mu$m to 100 $\mu$m. As previously stated, the shifting or movement of the valve needle or other metering device components due to varying thermal loads or other external factors is approximately of the same order of magnitude as the movement during the metering process.

For example, the thermally-conditioned movement or shifting of the valve needle due to varying temperature loads that ranges from $-40°$ C. to $160°$ C. is approximately 12 $\mu$m for a valve needle that is made of invar and ranges from approximately 60 $\mu$m to 96 $\mu$m for a valve needle that is made of steel. These calculations are based on the fundamental relationship that exists between a change in length of a material relative to a change in temperature. This relationship is identified by the following formula: $\Delta 1 = 1_0 k' \Delta T$ where $\Delta 1$ represents the change of length, $1_0$ represents the length of the material, where k' represents the thermal expansion coefficient of the material, and where $\Delta T$ represents the change in temperature. In this case, the calculations were further based on an approximate valve needle length $1_0$ of 30 mm, an invar $k'=2\times 10^{-6} 1/K$ and a steel k' that ranges from $10\times 10^{-6} 1/K$ to $16\times 10^{-6} 1/K$. The assumptions made in this calculation, such as the varying temperature load and valve needle length, are typical for fuel injectors within automobile engines.

As previously stated, the thermally-conditioned motion of various metering device components can have an undesirable effect on the metering process due to the fact that each component shifts or moves differently relative to the other and due to the fact that the shifting or movement cannot be predicted with certainty. For example, the material of the piezo-actuator has a thermal expansion coefficient that ranges from $\pm 3\times 10^{-6}$. Moreover, other external factors, such as aging and settling may, alone or in combination, may result in shifting or movement that is similar to the thermally-conditioned motion.

Figure 1:
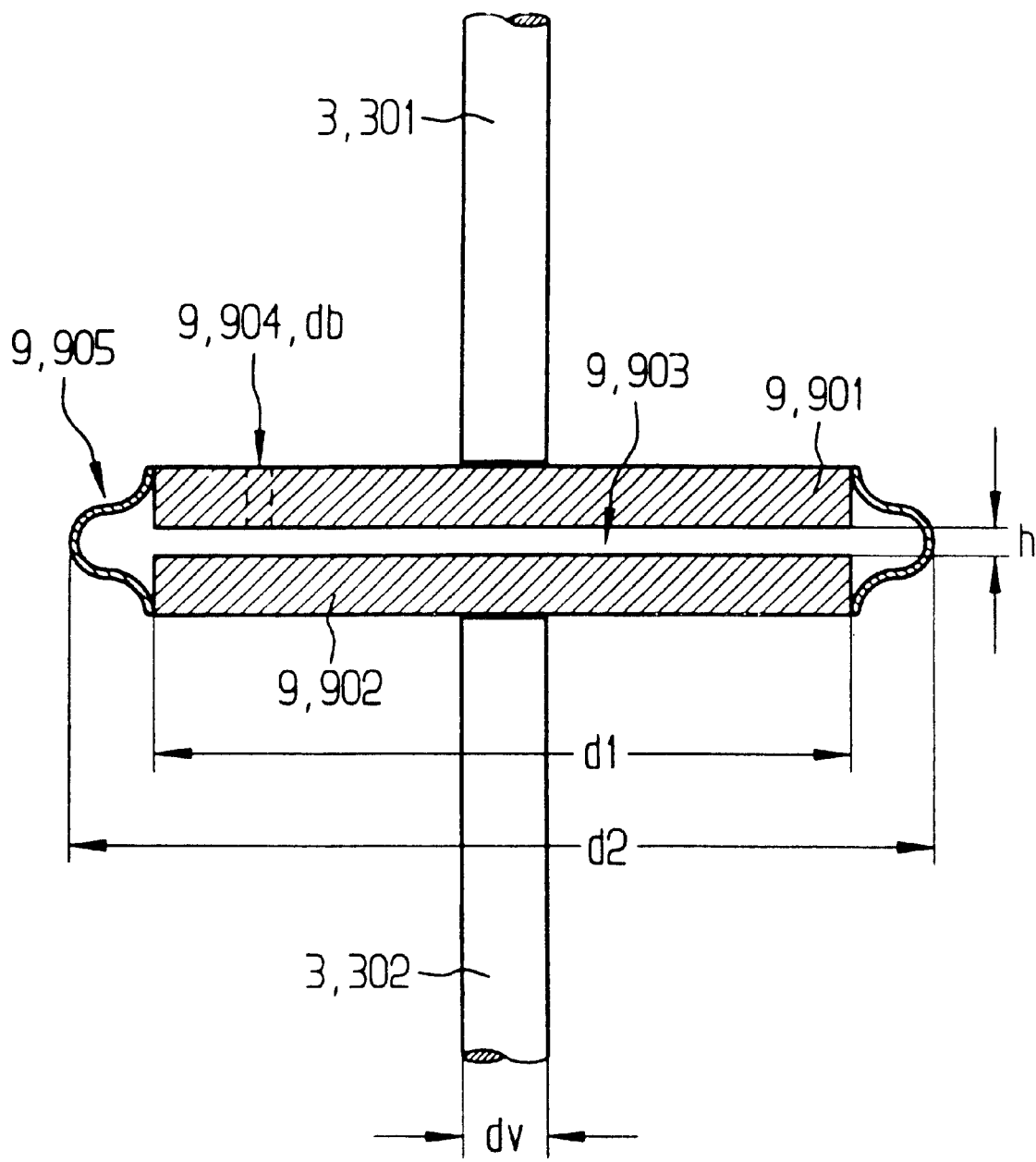
FIG. 1 is a side sectional view of the compensating element.
Figure 2:
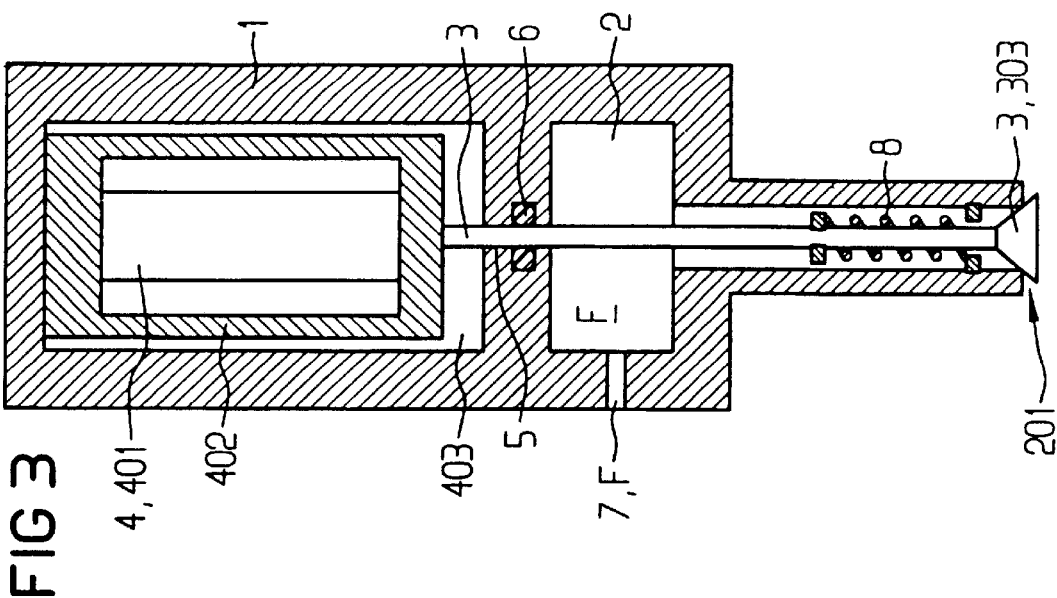
FIG. 2 is a side sectional view of the metering device with the compensating element.

In order to minimize or effectively reduce the undesirable effects of shifting or motion due to varying thermal loads or other external factors, a compensating element generally indicated at 9 of FIG. 1 can be utilized within the metering device. As FIG. 2 illustrates, the compensating element 9 is located within the fluid chamber 2 and is attached between a first needle part 301 of the valve needle 3 and a second needle part 302 of the valve needle 3. The compensating element 9 further includes a hydraulic chamber 903 that is defined by a first wall 901, a second wall 902 and an outside wall 905 of the compensating element 9. The first wall 901 and the second wall 902 are preferably shaped in a discoid or disk-shaped manner and preferably have the same diameter d1. The first wall 901 is preferably attached at the first needle part 301 in an axially centered manner. Likewise, the second wall 902 is attached at the second needle part 302 in an axially centered manner. The spacing between the first wall 901 and the second wall 902 is referred to as a chamber height h.

In an exemplary embodiment, the first wall 901 and the second wall 902 are steel disks with a diameter d1. The diameter d1 preferably ranges from approximately 5 mm to approximately 25 mm. Both the first wall 901 and the second wall 902 have a thickness wherein the thickness is approximately 1 mm. In addition, the diameter d2 of the entire compensating element is preferably a few millimeters greater than the diameter d1 of the steel disks of both the first wall 901 and the second wall 902.

The outside wall preferably includes a stainless steel bellows. The stainless steel bellows of the outside wall 905 is welded to the first wall 901 and the second wall 902 at each wall's respective edge. In this way, the chamber height h ranges from approximately 20 $\mu$m to 250 $\mu$m. However, the outside wall 905 is not limited by its construction only to the extent that the outside wall 905 operates or moves more freely and easily in the longitudinal direction that in the radial direction. As a result, a change in the compensating element spacing or chamber height is not significantly impeded, whereas a significant radial expansion does not occur.

The compensating element hydraulic chamber 903 is connected to the fluid chamber 2 via at least one compensating element opening 904 that allows for a fluid exchanged between the hydraulic chamber 903 to the fluid chamber 2. In an exemplary embodiment, the opening 904 is shaped as a micro bore that leads through the first wall 901. The micro bore has a diameter db. However, the shape of the opening 904 can be adapted in a variety of different ways such as a slot that is slot-shaped or polygonal-shaped or shaped in a similar manner. In addition, the present invention is not limited by the number of compensating element openings and the location of the compensating element openings. For example, any wall, that is, the first wall 901, second wall 902, outside wall 905, or combination thereof, of the compensating element can include a multitude of openings.

The hydraulic chamber 903 is preferably filled with a fluid F that is hydrostatically coupled with the surrounding fluid F. In this way, the same static pressure is present in the hydraulic chamber 903 and the fluid chamber 2 in the initial state wherein essentially no forces are acting on the compensating element 9 in this initial state.

The diameter db of the compensating element opening 904 is preferably adjusted so that the compensating element 9 effectively operates to compensate for the shifting or movement of the various metering device components due to varying thermal loads or other external factors. At the same time, the compensating element operates to provide little, if any, lift loss during the delivery of fluid within the metering process. In order to operate this way, the compensating element preferably effects a change in the shifting or movement due to external factors over a time frame that is on order of at least 100 times the duration of the metering process. This 100 time frame factor corresponds to the fact that the duration of shifting or movement due to external factors is generally at least 100 times the duration of the metering process. The duration of shifting or movement due to external factors can occur over a period of a seconds, whereas the entire metering process can occur over a period of 10 ms. In addition, the separate stages of the metering process, such as the opening and closing of the orifice 201, can occur over time frames ranging from 1 $\mu$s to 10 $\mu$s. However, the present invention is not limited by this 100 time frame factor wherein the compensating element opening 904 can be adjusted to accommodate for time frame actors lower than 100.

For effective operation of the compensating element 9, the diameter db is selected such that the change in volume of the hydraulic chamber 903 generated by a movement of the valve needle 3 due to external factors occurs within a time frame that is at least 100 times slower than the duration of the metering process. On the other hand, the diameter db must be so small that effectively no volume exchange occurs between the hydraulic chamber 903 and the fluid chamber 2 throughout the duration of the metering process, otherwise a lift loss will result as the lift force is transferred between the first 301 and second 302 valve needle parts.

In addition to adjusting the diameter db of the compensating element opening 9, the compensating element hydraulic chamber 903 preferably contains a fluid that exhibits a high spring constant. In this way, a lift loss does not occur due to the elasticity of the enclosed fluid F wherein the chamber height h is preferably maintained at approximately 100 $\mu$m.

Furthermore, the effects of the compensating element 9 can be adjusted by the location and number of compensating element openings 904. A multitude of compensating element openings 904 can be utilized wherein these openings are arranged on the first wall 901, the second wall 902, the outside wall 905 or combinations thereof depending on the applications of the metering device.

Turning to FIG. 2, this Figure illustrates the compensating element 9 as it is utilized within a metering device. In an exemplary embodiment, the metering device is utilized for injecting gasoline into a fuel engine. However, its application is not limited to fuel injectors wherein the metering device with compensating element can be utilized for a variety of applications, such as general atomizers for the purpose of cooling or coating.

In an exemplary embodiment, the compensating element preferably has a first wall 901 and second wall 902 diameter $d_1$ of approximately 8 mm and an overall diameter d2 of approximately 13 mm. The height of the outside wall 905 includes a shaft that is approximately 1.4 mm. Additional factors include the wall strength of the shaft being approximately 0.1 mm, the spring path ranging from ±150 $\mu$m, the spring constant being approximately 0.4 N/$\mu$m and the pressure loading capacity of approximately 30 bars.

Based on these factors, the spring constant k of the hydraulic chamber 903 is approximately equal to 170 N/$\mu$m where the chamber height h =1 mm and the compressibility factor $\kappa=1\times10^{-9}$ m$^2$/N which is a typical compressibility factor for gasoline. The spring constant is calculated based on the relationship that is represented by the following formula: $k=(\pi(d2/2)^2)^2/(h\cdot\kappa)=170$N/$\mu$m.

During the metering process, the first needle part 301 is initially displaced in the direction of the second needle part 302 via the actuating drive 4 in order to open the metering device. The forces that are transferred by the compensating element 9 have two components: 1) the closing force of the resetting spring 8 must be overcome; and 2) the inertial force of the valve needle 3 and the compensating element 9 must be transferred. The closing force is typically greater than 10 N during a gasoline or like fuel injection process. Regarding the inertial force, an inertial force of approximately 40 N results from the following assumptions. First, the length of the valve needle 3 is 25 mm, a diameter dv =2 mm and a density pn =8000 kg/m$^3$ for invar which results in an inertial mass of the valve needle 3 of approximately 0.4 g. In addition, the first wall 901 has a thickness of 1 mm and a diameter of 8 mm that results in an inertial mass of approximately 0.4 g. As a result, the total inertial mass of the combined valve needle 3 and the compensating element 9 is approximately 1 g. Assuming an average duration of a metering process of 100 µs and a duration of the initial acceleration phase of 10 µs as well as a movement of the first needle part 301 of 40 µm, the valve needle 3 moves at a rate of 0.4 m/s and an acceleration of 4000 m/s$^2$ from which an inertial force of 40 N results.

Taking into account these two force components, the compensating element must therefore be able to transfer forces up to a maximum of 50 N. For that purpose, a pressure difference of 4 bar preferably exists between the compensating element hydraulic chamber 903 and the fluid chamber 2.

During the initial state of the metering process, the piezo-actuator 401 is contracted in an axial direction and held under a compressive strain via a tube spring 402. The first needle part 301 of the valve needle 3 that is fastened at the tube spring 402 is respectively maximally withdrawn from the fluid chamber 2. With the aid of the resetting spring 8, the seal head 303 that is fastened at the second needle part 302 is pressed against the opening of the metering device 201. In this way, the housing 1 is hydraulically sealed. The seal head 303 preferably presses against the opening 201 from the outside of the housing 1 and therefore is pushed in the direction of the fluid chamber 2. In addition, in the initial state, the pressure of the fluid F in the hydraulic chamber 903 is adapted to the pressure in the surrounding fluid chamber 2 via the opening 904 of the compensating element 9.

When a change of temperature arises at the injector, the housing 1 or other parts that are situated in the housing, such as 4, 402, 301, 9, 302, and 303, can expand or shift or move. When the expansion, shifting, or movement of the housing 1 is different from that of the valve needle 3 or other previously described parts, the compensating element 9 acts to compensate for this difference of expansion as between the housing 1 and the other components of the metering device, such as the valve needle 3, by adjusting the chamber height h of the compensating element 9. The pressure difference in the hydraulic chamber 903 that results from the changed chamber height h is diminished by an exchange of the fluid F with the fluid chamber 2.

For example, when the valve needle 3 is more intensely elongated than the housing 1 due to a thermally-conditioned movement, the chamber height h is then lowered. Then, a flow of fluid F from the hydraulic chamber 903 into the fluid chamber 2 results thereof. As a result, the pressure between the seal head 303 and the opening or orifice 201 that results from the resetting spring 8 acting upon the valve needle 3 is not significantly reduced. Therefore, the housing 1 effectively remains hydraulically sealed even though the components of the metering device expand, shift or move due to changing thermal conditions or other external factors, such as aging or settling effects. Moreover, while the compensating element 9 effects a change in the shifting or movement due to changing thermal conditions, the effect of this change results in little, if any, lift loss due to the fact that the effects of the change in shifting or movement due to changing thermal conditions occurs at a slower rate than the movement during the delivery of fluid as previously discussed.

In an exemplary embodiment, the outside wall 905 includes an optimally low spring constant k so that the compensating element 9 has only to minimally act upon the metering device in order to compensate for the shifting or movement due to changing thermal conditions or other external factors, such as aging or settling effects.

Upon opening the metering device to the outside, the first needle part 301 is moved so quickly in the direction of the second needle part 302 via the actuating drive that only a negligible small volume exchange results between the hydraulic chamber 903 and the fluid chamber 2. This result occurs because of the appropriately dimensioned diameter db of the compensating element opening 904. As a result, the force transfer between the two needle parts 301 and 302 via the fluid F in the hydraulic chamber is no longer negligible. Rather, the compressibility of the hydraulic chamber 903 is now mainly determined by the compression of the fluid F contained therein. This occurrence is analogous to an insertion of an optimally stiff spring in place of the outside wall 905 of the exemplary embodiment of this invention. Because of the forces acting upon the valve needle 3, a fast movement of the first needle part 301 toward the second needle part 302 occurs. As a result, the seal head 303 is lifted from the orifice or opening 201 wherein the fluid is delivered through the opening 201. In addition, the resultant pressure wave that occurs due to this fast motion for effecting the ejection of the fluid F from the fluid chamber 2 insignificantly disrupts the operation of the metering device.

Once fluid is delivered through the opening, the piezo-actuator contracts or acts upon the valve needle 3 in a direction for closing the housing, The piezo-actuator acts to close the opening in a time frame that is as comparably fast as the time frame in which the piezo-actuator acts to deliver fluid. In this way, the first needle part 301 via the compensating element 9 and also the second needle part 302 are withdrawn or move to close the opening 201 without any significant delay. As a result, the seal head 303 again hydraulically seals the housing 1 at the opening 201.

As previously addressed and further emphasized, the selection of the diameter db of the compensating element opening 904 is important to the effective operation of the compensating element 9. Based on fundamental fluid dynamic principles and the following assumptions in accordance with an exemplary embodiment of the present invention, an optimal micro bore diameter db of the compensating element opening 904 is approximated at 23 µm wherein the compensating element 9 must overcome forces of up to 50 N. This calculation is based on the fundamental fluid dynamic principle as represented by the Bernoulli equation as follows:

$$Q = \left(\frac{db}{2}\right)^2 \cdot \pi \sqrt{\frac{2 \cdot \Delta p}{1.8 \cdot \rho F}}$$

Other assumptions that were made in this calculation include: 1) the maximal injection duration of 10 ms; 2) a force of 50 N is transferred via this injection duration by the compensating element 9, wherein a pressure difference Δp of 4 bar exists between hydraulic chamber 903 and fluid chamber 2; 3) the maximal allowed change of the chamber height h via the injection duration is 1 μm; 4) the average volume flow Q is maximally be $132.7 \times 10^{-10}$ m$^3$/s over the injection period; and 5) a typical throttle correction value of 1.8 and a density ρF of the fluid F.

However, in practice, the 50 N assumption applies to forces that are transferred during the acceleration phase of the metering process. Assuming that the typical duration of the acceleration is approximately 10 μs, it follows that only the approximate 10 N force of the resetting spring 8 must be held during the remaining metering time. Therefore, the practical limit of the diameter db can be selected significantly larger than the previously calculated value.

Although modifications and changes may be suggested by those skilled in the art, it is the intention of the inventors to embody within the patent warranted hereon all changes and modifications as reasonably and properly come within the scope of their contribution to the art.

We claim as our invention:

1. A metering device, comprising:
   a plurality of metering components, said metering components including a housing, an actuating device, a valve needle, and a compensating element;
   said housing enclosing said valve needle, said actuating device, and said compensating element, said housing further defining a fluid chamber, said fluid chamber containing a pressurized fluid and having a housing opening for delivery of said fluid through said housing opening from said fluid chamber;
   said valve needle being axially displaceable within said fluid chamber, said valve needle having a first needle part and a second needle part, said second needle part having a valve member for closing said housing opening;
   said actuating device being connected to said first needle part of said valve needle for controlling a metering movement of said valve needle during said delivery of said fluid wherein a lift force is transferred between said first needle part and said second needle part to lift the valve member off the housing opening; and
   said compensating element being disposed in said fluid chamber and between said first and second needle parts, said compensating element having a compensating element hydraulic chamber and at least one compensating element opening, said compensating element hydraulic chamber being defined by a compensating element first wall, a compensating element second all and a compensating element outside wall, said compensating element first and second walls being flexibly connected by said compensating element outside wall for defining a compensating element spacing between said compensating element first and second walls,
   said compensating element hydraulic chamber being hydraulically connected to said fluid chamber via said at least one compensating element opening, said at least one compensating element opening being positioned and constructed so that said compensating element effectively compensates for a shifting motion of said metering device components due to a plurality of external factors by changing said compensating element spacing.

2. A metering device according to claim 1 wherein said metering device includes a resetting spring and wherein said resetting spring presses said valve member of the second needle part against said housing opening for hydraulically sealing said housing opening.

3. A metering device according to claim 1 wherein said shifting motion is slower than said metering movement by at least a factor of 100.

4. A metering device according to claim 1 wherein said compensating element first wall and said compensating second wall are discoid in shape and wherein said compensating element first and second walls are attached perpendicularly to said valve needle parts and centered relative to a longitudinal axis of said valve needle parts.

5. A metering device according to claim 1 wherein said compensating element first wall and said compensating element second wall have equal radial diameters.

6. A metering device according to claim 5 wherein said diameter of both of said compensating element first and second walls range from approximately 5 mm to approximately 25 mm.

7. A metering device according to claim 1 wherein said hydraulic chamber includes a chamber height and wherein said chamber height ranges approximately from 20 μm to approximately 250 μm.

8. A metering device according to claim 1 wherein said outside wall includes a bellows, said outside wall is attached to an outer edge of both of said compensating element first and second walls, said outside wall connects said compensating element first wall to said compensating element second wall in a hydraulically sealed manner.

9. A metering device according to claim 1 wherein said pressurized fluid includes a fluid pressure, said fluid pressure ranges from approximately 150 bar to approximately 1000 bar.

10. A metering device according to claim 1 wherein said housing opening is closed from an outside of said housing by displacement of said valve needle.

11. A metering device according to claim 1 wherein said housing opening is closed from an inside of said housing by displacement of said valve needle.

12. A metering device according to claim 1 wherein said fluid is a fuel.

13. A metering device according to claim 12 wherein said metering device is installed within an internal combustion engine.

14. A method for delivering fluid that employs a metering device with a compensating element comprising the steps of:
   providing a metering device having a plurality of metering components, said plurality of metering components including a housing having a housing interior, said housing interior enclosing a pressurized fluid, an actuating drive, a valve needle, and said compensating element, said housing further defining a fluid chamber and terminating at a housing opening for communicating with an exterior of said housing,
   said valve needle being axially displaceable within said fluid chamber, said valve needle having a first needle part and a second needle part,
   said actuating device being connected to said first needle part of said valve needle for controlling a metering movement of said valve needle during said delivery of said fluid,
   said compensating element being disposed in said fluid chamber between said first and said second needle parts of said valve needle, said compensating element having a compensating element hydraulic chamber and a compensating element opening, said compensating element hydraulic chamber having a compensating element spacing and being defined by a compensating element first wall, a compensating element second wall, and a compensating element outside wall, said compensating element first and second walls being connected by said compensating element outside wall, said compensating element hydraulic chamber being hydraulically connected to said fluid chamber via said compensating element opening, said compensating element opening being dimensioned so that said compensating element effectively compensates for a shifting movement of said metering components due to external factors;

displacing said valve needle in a first direction to an initial state by moving said actuating drive;

hydraulically sealing said housing opening with said second needle part during said initial state;

delivering said fluid through said housing opening by displacing said valve needle with said actuating device in a second direction; and compensating for said shifting of said metering components by adjusting said compensating element spacing.

15. A method according to claim 14 further comprising the step of closing said housing opening from said exterior during said initial state by said displacement of said valve needle.

16. A method according to claim 14 further comprising the step of closing said housing opening from said housing interior during said initial state by said displacement of said valve needle.

17. A method according to claim 14 further comprising the step of moving said valve needle during said fluid delivery for a metering duration wherein said metering duration ranges from approximately 1 $\mu$s to approximately 10 ms.

18. A method according to claim 17 further comprising the step of shifting said metering components due to external factors for a shifting duration, said shifting duration is slower than said metering duration by at least a factor of 100.

19. A method according to claim 14 further comprising the step of pressing said second needle part against said housing opening by a spring element.

20. A method according to claim 14 further comprising the step of utilizing said metering device within a fuel injector.

* * * * *